Figure 1:
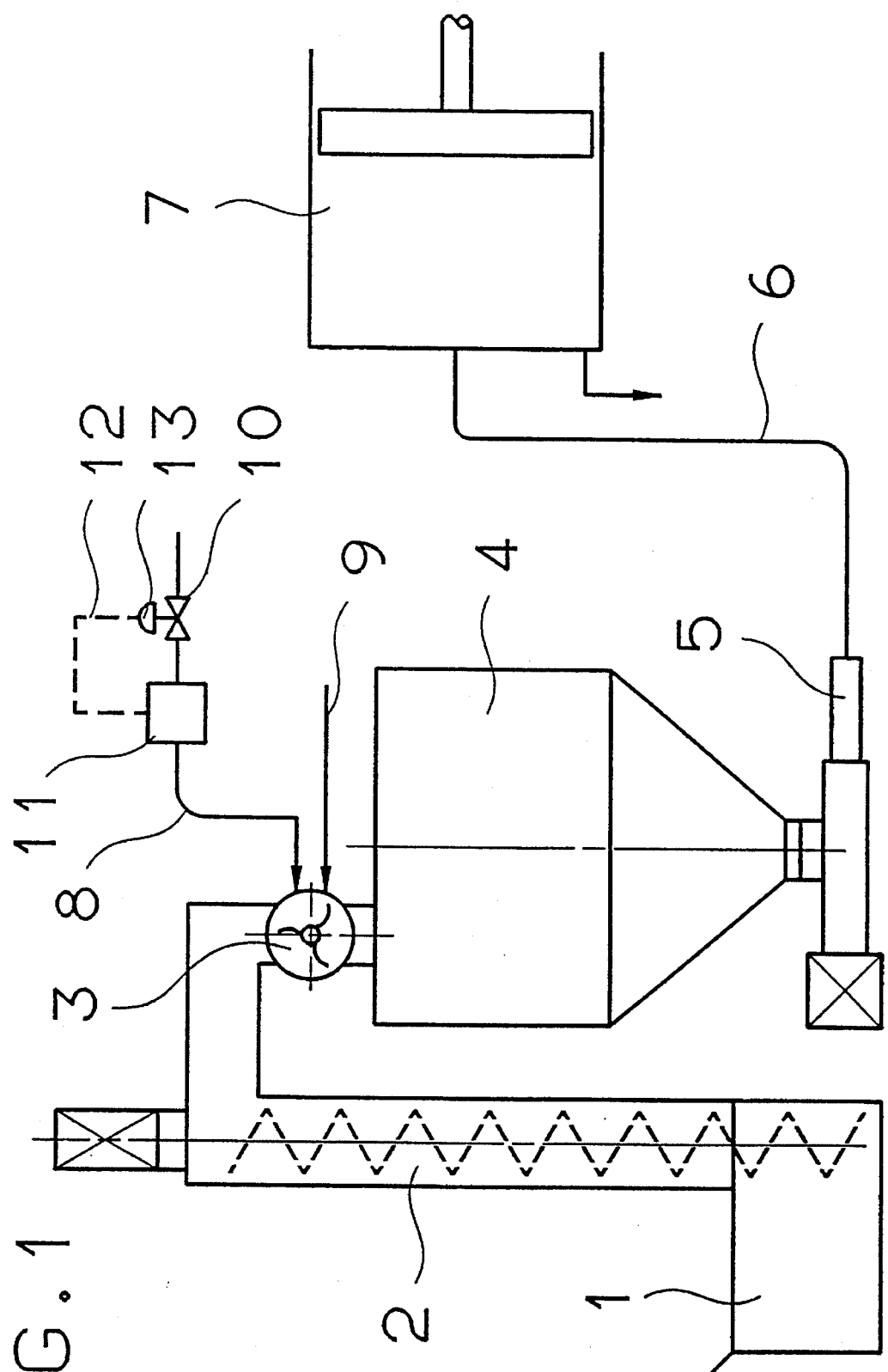

United States Patent [19]

Hartmann

[11] Patent Number: 5,616,357
[45] Date of Patent: Apr. 1, 1997

[54] PROCESS AND APPARATUS FOR SEPARATING SOLID AND LIQUID PORTIONS OF CRUSHED FRUITS

[75] Inventor: Eduard Hartmann, Schneisingen, Switzerland

[73] Assignee: Bucher-Guyer AG Maschinenfabrik, Niederweningen, Switzerland

[21] Appl. No.: 335,770

[22] PCT Filed: Mar. 11, 1994

[86] PCT No.: PCT/CH94/00052

§ 371 Date: Nov. 8, 1994

§ 102(e) Date: Nov. 8, 1994

[87] PCT Pub. No.: WO94/22332

PCT Pub. Date: Oct. 13, 1994

[30] Foreign Application Priority Data

Apr. 2, 1993 [CH] Switzerland .............. 01013/93

[51] Int. Cl.$^6$ ...................................... A23L 2/04
[52] U.S. Cl. ............ 426/478; 426/481; 426/489; 99/487; 99/493; 99/495; 99/509; 100/45; 100/70 R; 100/73; 100/99; 435/267
[58] Field of Search ............... 426/478, 481, 426/489, 495, 49, 51, 52; 100/37, 45, 48, 70 R, 73, 99, 111, 131; 99/485, 486, 487, 493, 495, 509; 435/267

[56] References Cited

U.S. PATENT DOCUMENTS

| | | |
|---|---|---|
| 1,429,679 | 9/1922 | Hieber ............................. 426/489 |
| 2,419,545 | 4/1947 | Gray et al. ....................... 426/481 |
| 3,103,438 | 9/1963 | Rowse .......................... 426/482 X |
| 3,116,682 | 1/1964 | MacKenzie ...................... 100/112 |
| 3,346,392 | 10/1967 | Lowe et al. ...................... 426/481 |
| 3,401,040 | 9/1968 | Nury ................................ 426/51 |
| 4,275,648 | 1/1981 | Mouri et al. .................. 426/51 X |
| 4,323,007 | 4/1982 | Hunt et al. ....................... 100/37 |
| 4,483,875 | 11/1984 | Dorreich ...................... 426/51 X |
| 4,716,044 | 12/1987 | Thomas et al. .................... 426/51 |
| 5,096,719 | 3/1992 | Gresch ........................ 426/478 X |
| 5,156,872 | 10/1992 | Lee ............................ 426/481 X |
| 5,207,154 | 5/1993 | Bonnet ....................... 426/478 X |
| 5,231,922 | 8/1993 | Hartmann .................... 426/489 X |

FOREIGN PATENT DOCUMENTS 0485901  8/1991  European Pat. Off. .

*Primary Examiner*—Milton Cano
*Attorney, Agent, or Firm*—Edmund M. Jaskiewicz

[57] ABSTRACT

A process to separate insoluble solid portions from soluble liquid materials of fruits with increased performance and yield using a press (7) wherein water, is first supplied to a mill for crushing the fruit. The soluble materials are then separated from the solid portions as juice in the press (7). The relationship between water feed and fruit feed can be controlled by a of microprocessor (22). An apparatus for carrying out this process is also disclosed.

5 Claims, 4 Drawing Sheets

PROCESS AND APPARATUS FOR SEPARATING SOLID AND LIQUID PORTIONS OF CRUSHED FRUITS

The invention relates to a process for separating soluble materials from insoluble solid portions in at least partially crushed cell association, especially of fruits, using a press, centrifuge or a decanter, and a solvent, and a device for its implementation.

The capacity of an apple mash to be pressed is characterized primarily by the ratio of hardness of the cell structure to the viscosity of the juice. Especially in stored apples or in the cloudy juice process this ratio is very unfavorable. This results in highly reduced and a decreased press performances The use of mash enzymes to increase yield and performance is not always feasible because of reasons of process engineering or of economic reasons.

If belt presses are used for solid-liquid separation, in order to achieve acceptable performance and yield multi-stage systems are used which run with intermediate soaking and a water percentage from 20 to 40% relative to the raw product. Thus, according to DE-C2 26 44 976 (R. Basnard) a belt press for expressing liquids contained in pulps is known. This press comprises one rotating endless upper and lower filter band each of which is guided over guide rolls and their adjacent sections are pressed against one another by press rollers. As a result, the pulp on the upper section of the upper filter belt undergoes filtration, then stirring of the pulpy residue with the addition of a solvent, and finally pressing between the two filter belts. Under the end of the upper piece of the upper filter belt there are a mixing chamber with a water feed line, a stirring mechanism, and an overflow on the mixing chamber above the inlet section of the lower filter belt.

Furthermore, according to EP-A10 149 183 (Bellmer) a process is known for expressing especially fruits in at least two steps. In doing so, in the first step the fruits are expressed to obtain pure juice of prime quality in a press and from the fruit concentrate (marc) a juice of second quality (nectar, fruit juice beverage) is obtained using water. The marc discharged by the press is enriched with a proportionable amount of water and passes through a reaction station where it remains for an adjustable time. Finally, it is sent directly to a second pressing.

The object of the present invention is to increase the performance and yield in solid-liquid separation processes.

The object of this invention is achieved by a process of the type mentioned initially which is characterized by the fact that first the solvent is sent to an at least partially crushed cell agglomerations and then the liquid portions of the mixture of the cell agglomeration and solvent are separated from the solid portions with the press, centrifuge, or with a decanter.

According to one advantageous feature of the invention a liquid, especially water, alcohol or hydrochloric acid is supplied as the solvent.

According to another feature of the invention the supply of liquid is controlled depending on the amount of at least partially crushed cell associations which are supplied.

Preferably, the amount of supplied liquid is controlled proportionally to the amount of supplied cell agglomerations such that the juice yield is 90% by weight of the amount of supplied cell agglomerations.

An apparatus for performing the process comprises a fruit tank, a mill attached to the tank for crushing the fruit, a pump with discharge line for the at least partially crushed cell agglomerations and a press for solid-liquid separation. This apparatus characterized by means for supplying water to the mill, by means for measuring the decrease of the contents of the fruit tank and by a controller for the amount of water supplied to the mill which is supplied with the output signal of the measurement means for the amount of fruit as the command variable.

One embodiment of the apparatus according to the invention is characterized by a controller comprising a flowmeter for the supplied water and a microprocessor to which the measurement signals of the flowmeter and the measurement means for the amount of fruit are sent and which generates a control signal for controlling a valve for water inflow, the microprocessor having adjustment means for preselection of the relationship between the water supply and the amount of supplied cell associations.

Other features of the invention can be found in the patent claims.

The advantages gained with the invention lie in the increase in performance and yield compared to processes without preliminary addition of water. For sorted fruit with mash enzyme action it was possible to double performance with water supply according to the invention of 20% with the same yield. Compared to adding water to the marc after to a first pressing process the preliminary addition of water according to the invention yields the economic advantage that less investment is necessary for the same performance and yield because only one pressing process is necessary. In this case it is assumed that the same amount of water is vaporized in both cases when the juice is subsequently concentrated.

The invention is detailed in the following description and the drawing which represents four embodiments.

Figure 2:
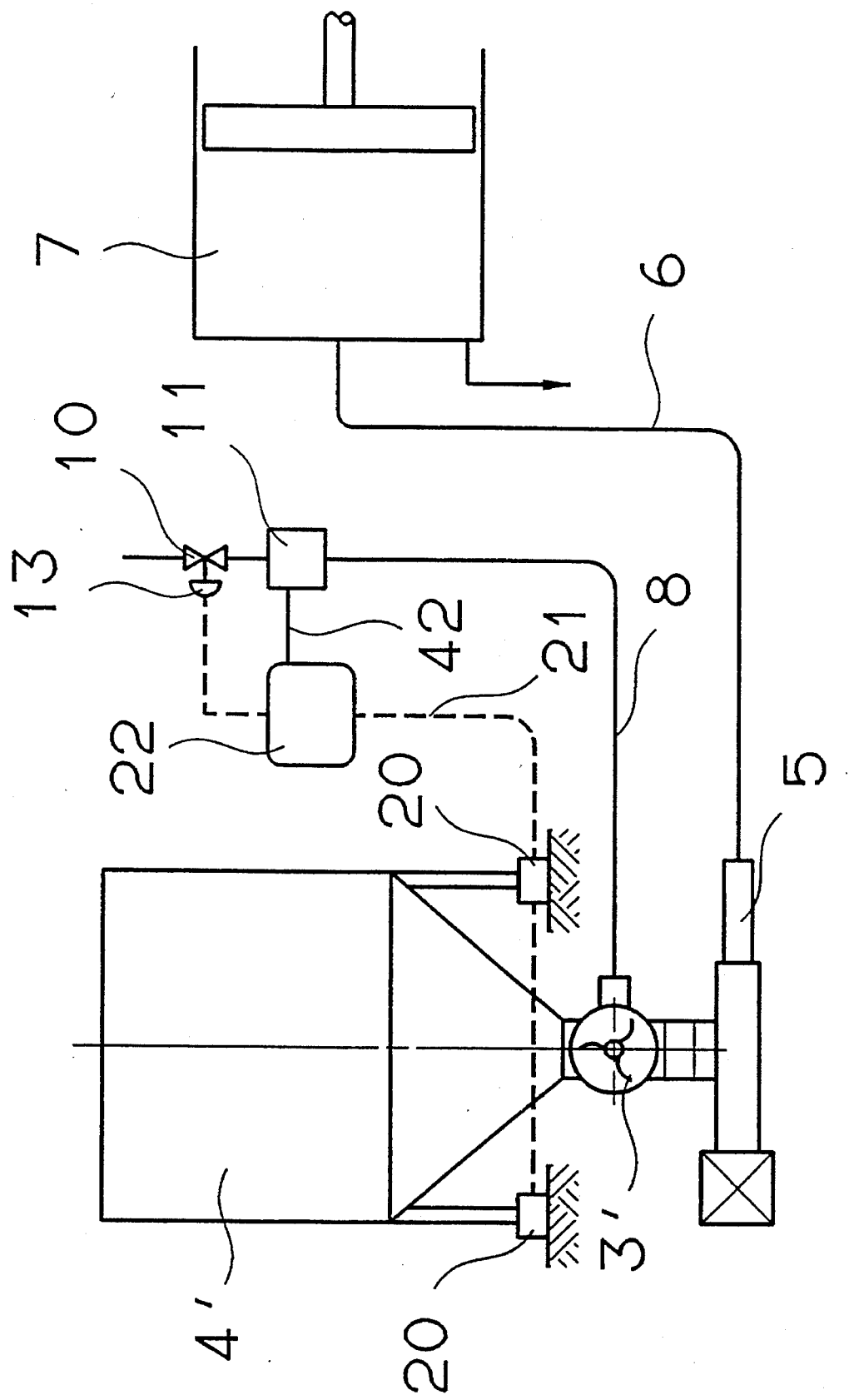
Figure 3:
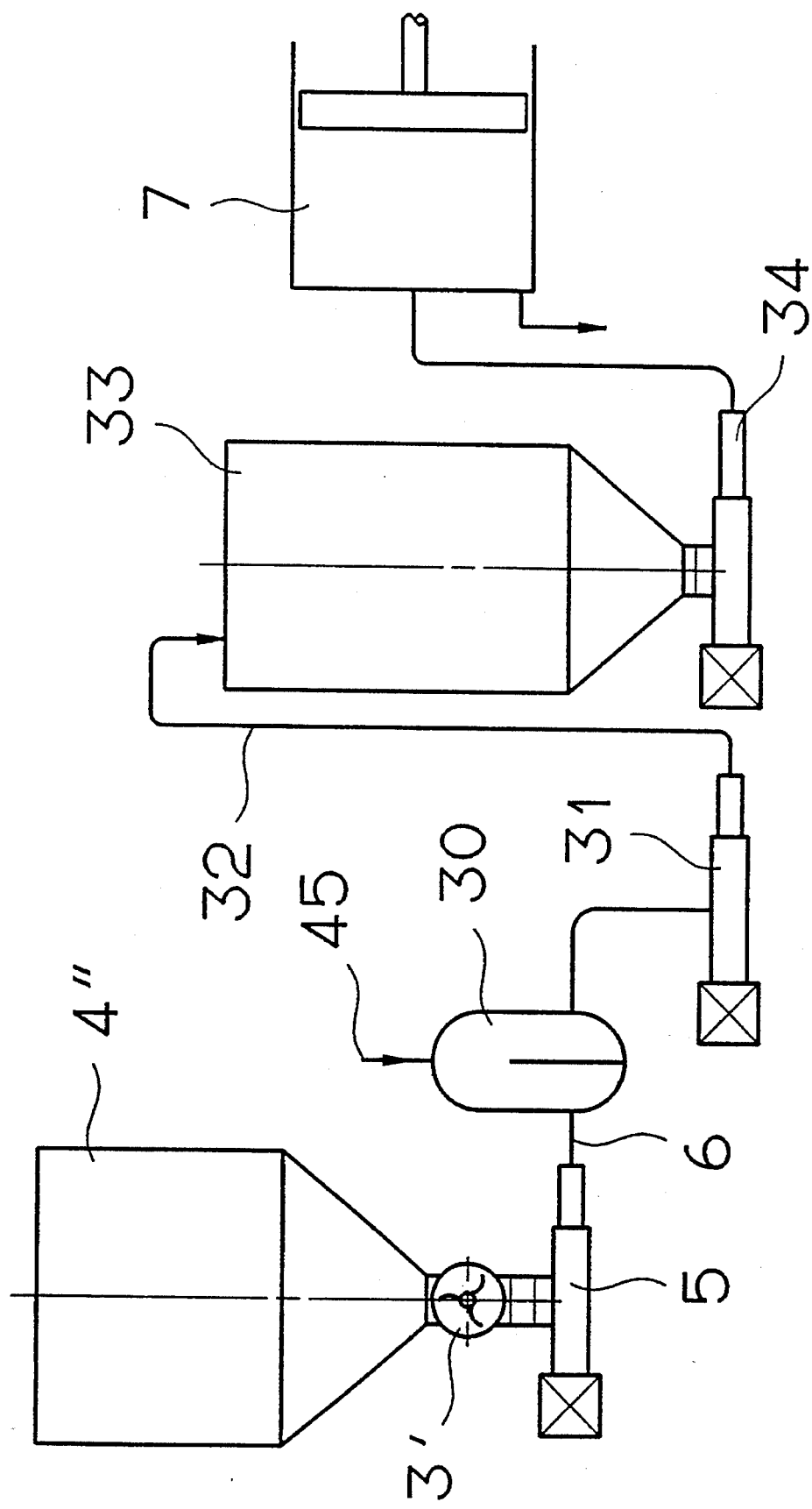
Figure 4:
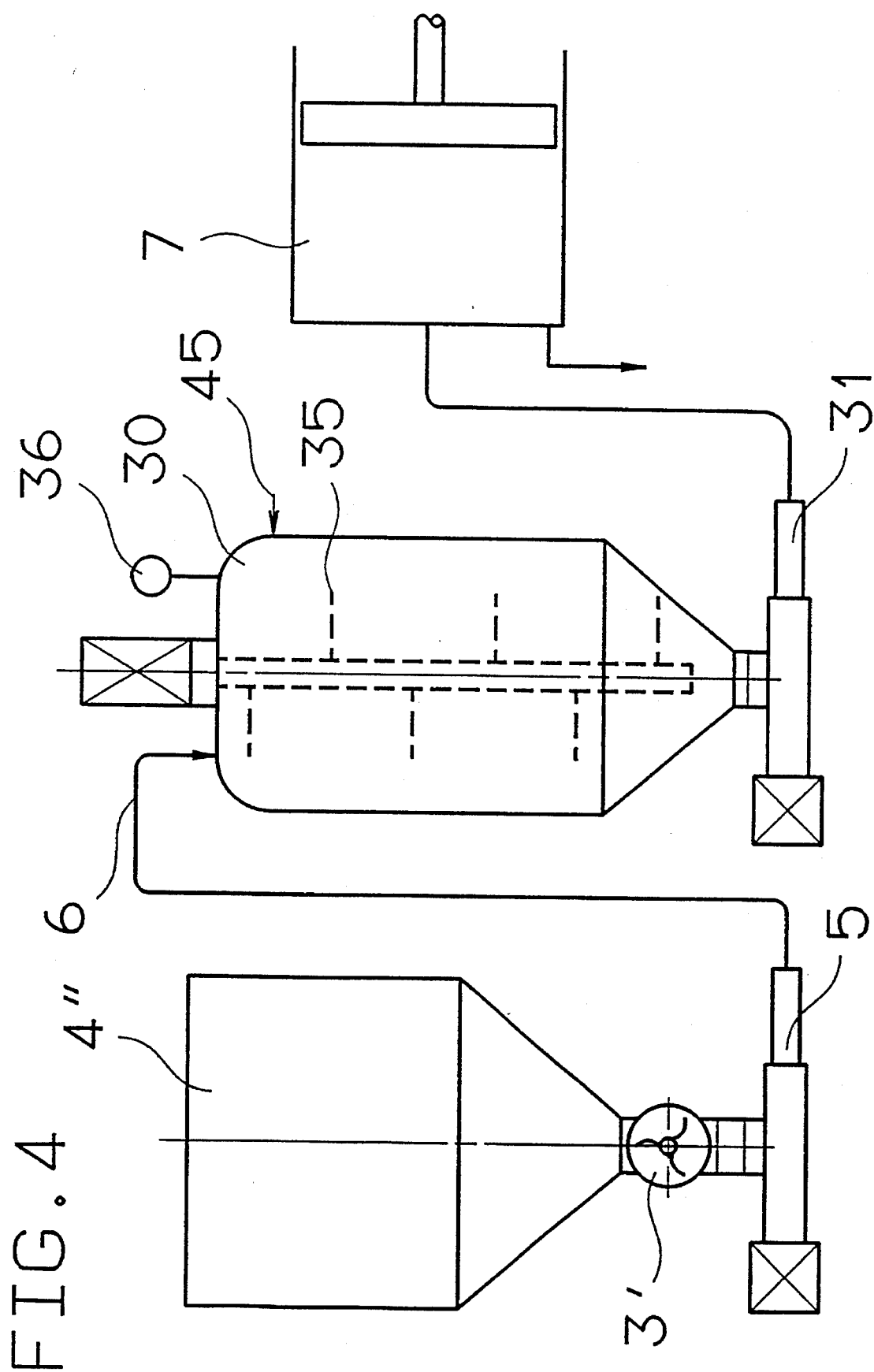

FIG. 1 shows a diagram of a device according to the invention for separation of the solid and soluble portions of fruits, FIG. 2 shows a diagram of a device according to FIG. 1 with a microprocessor, FIG. 3 shows an addition to a device according to FIGS. 1 or 2 with a pressure tank as the diffusion reactor and FIG. 4 shows another addition to a device according to FIGS. 1 or 2 with a pressure tank as the diffusion reactor.

The separation device shown in FIG. 1 comprises a low storage bin or silo 1 for holding fruit to be juiced. A vertical conveyor 2 is connected to the storage bin 1 and delivers the apples or pears to the input of a sieve mill assembly 3 for mashing the fruit which then travels to a collecting tank 4. A pump 5 is connected to tank 4 and delivers the mash through a delivery line 6 to a press 7 for separation of the liquid fruit portions with the extracted materials dissolved therein.

As FIG. 1 shows, the sieve mill 3 has a feed line 8 for water as the solvent and a feed line 9 for enzymes supplied after supplying the solvent to improve material extraction. A control valve 10 and a flowmeter 11 are connected to water feed line 8. An output signal of the flowmeter is sent via line 12 to control stage 13 for controlling valve 10. With control circuit 10, 11, 12 and 13, a constant water flow on feed 8 is achieved; its magnitude is adjustable on control stage 13.

It is apparent from test results that the novel supplying of water in a very early stage of the process promotes the diffusion effect in mash tank 4 and in press 7.

In FIG. 2 the components which correspond to FIG. 1 bear the reference numbers already described. In the device shown in FIG. 2 the fruit moves from vertical conveyor 2 first into fruit collecting tank 4' to which sieve mill 3' is connected on the outlet side. The ground fruit then travels via pump 5 and line 6 again to press 7. Water for improving extraction is similarly sent via feed 8, cock 10 and flowmeter 11 to sieve mill 3'.

For improved proportioning, collecting tank 4' has weighing means 20 whose output signal is available on line 21 and provides information about the quantity of fruit which is being discharged from the collecting tank per second. This signal is sent through line 21 to microprocessor 22 which, at the same time, receives from flowmeter 11 via line 42 a signal which measures the amount of water supplied per second to sieve mill 3'. Microprocessor 22 processes the signals supplied to it into a control signal for the water inflow which acts on valve 10 via control stage 13.

Programs can be stored in microprocessor 22 which define the relationship between the liquid feed via feed line 8 and the amount of cell agglomerations supplied from fruit collecting tank 4' to sieve mill 3'. It has been shown that for this relationship, a proportionality of at least 5% water feed can be selected advantageously, the proportionality factor being determined such that the juice yield on press 7 in kg of juice is roughly 90% of the amount of cell associations supplied to sieve mill 3' in kg of fruit.

FIG. 3 shows schematically one version of the separating device according to FIG. 2. Here the mash to which water has been added beforehand in sieve mill 3' is discharged by pump 5, not diffusion reactor. In pressure tank 30, the mixture of cell agglomerations and the solvent is exposed to an excess pressure of air or nitrogen via connection 45 and is retained under an excess pressure of preferably 5 bar for a predetermined time. Subsequently, this mixture is sent via pump 31, line 32, buffer tank 33 and another pump 34 to press 7.

In FIG. 4 pressure tank 30 is shown according to FIG. 3 with additional details, in this arrangement buffer tank 33 being omitted. Pressure tank 30 is equipped with a stirring mechanism 35 and a manometer 36.

The invention is not limited to the described embodiments. Thus, it is feasible to deliver hot water instead of cold water to sieve mills 3 or 3'. This supply of water can also take place before or after the mill. For supply after the mill, weighing means 20 for determining the supplied amount of fruit can be replaced advantageously by a flowmeter; its measured variable can be weighted in microprocessor 22 with an average valve for mash density. Instead of press 7, centrifuges or decanters can be used for slid-liquid separation.

It will be understood that this invention is susceptible to modification in order to adapt it to different usages and conditions, and accordingly, it is desired to comprehend such modifications within this invention as may fall within the scope of the appended claims.

I claim:

1. A process for the separation of soluble substances from insoluble solid portions in an agglomeration of partially crushed cells of fruit, comprising the steps: of: crushing in a mill a fruit from which juice is to be obtained to form an agglomeration of at least partially crushed cells of the fruit; supplying a solvent to the mill to at least the agglomeration of the partially crushed cells of fruit to increase the yield of juice separated from he insoluble solid portions of the crushed fruit, to the order of 90% by weight of the amount of supplied cell agglomerations, the solvent comprising a liquid selected from the group consisting of water, alcohol or hydrochloric acid; and passing the mixture of partially crushed cell agglomeration and solvent through one of a press, centrifuge or decanter to separate the liquid portion of the mixture from the solid portions therein.

2. A process as claimed in claim 1 further comprising the step of supplying an enzyme to the agglomeration after supplying the solvent to the agglomeration.

3. A process as claimed in claim 1 further comprising the step of subjecting the mixture of cell agglomerations and solvent to an excess pressure of one of air or nitrogen prior to separation of the liquid and solid portions, and retaining the mixture under this excess pressure for a predetermined time.

4. An apparatus for the separation of soluble substances from insoluble solid portions in an agglomeration of at least partially crushed cells of fruit comprising: means for crushing fruit so as to obtain at least partially crushed agglomeration of cells of the fruit and having an outlet; a container connected to said crushing means outlet to receive the crushed fruit and having a discharge line therefrom; a pump in said discharge line; a press connected to said discharge line for separation of the liquid an solid portions in said agglomeration; means connected to said crushing means for supplying water thereto; means for measuring a decrease in the quantity of the contents of said container and for generating an output signal indicative of said quantity; and means connected to said water supplying means for controlling the quantity of water supplied to said crushing means in response to said output signal such that the water supplied is a function of the quantity of crushed fruit tin the container, said means for controlling comprising a flow meter and a microprocessor receiving said output signal which generates a control signal responsive to said output signal; a water inflow valve in said water supplying means and actuated by said control signal, said microprocessor having means for preselecting of a desired relationship between the supplying of water and the quantity of cell agglomerations, said microprocessor further has means for setting the quantity of supplied water as a function of the decrease of the weight of the tank.

5. An apparatus as claimed in claim 4 and further comprising a pressure tank connected as a diffusion reactor in said container discharge line and subjected to a pressure of about 5 bar, said pressure tank having means for stirring therein.

* * * * *